United States Patent
Li Voti et al.

(10) Patent No.: US 12,203,763 B2
(45) Date of Patent: Jan. 21, 2025

(54) GEOGRAPHIC ROUTE BASED COMMUNICATION METHOD AND SYSTEM

(71) Applicant: The Nielsen Company (US), LLC, New York, NY (US)

(72) Inventors: John T. Li Voti, Clearwater, FL (US); Stanley Wellington Woodruff, III, Palm Harbor, FL (US); John Sormark, Walnut Creek, CA (US)

(73) Assignee: The Nielsen Company (US), LLC, New York, NY (US)

( * ) Notice: Subject to any disclaimer, the term of this patent is extended or adjusted under 35 U.S.C. 154(b) by 237 days.

(21) Appl. No.: 17/233,041

(22) Filed: Apr. 16, 2021

(65) Prior Publication Data
US 2022/0205797 A1    Jun. 30, 2022

Related U.S. Application Data

(60) Provisional application No. 63/133,044, filed on Dec. 31, 2020.

(51) Int. Cl.
| | | |
|---|---|---|
| *G01C 21/34* | (2006.01) | |
| *G06N 20/00* | (2019.01) | |
| *G06Q 30/0241* | (2023.01) | |

(52) U.S. Cl.
CPC ......... *G01C 21/3476* (2013.01); *G06N 20/00* (2019.01); *G06Q 30/0277* (2013.01)

(58) Field of Classification Search
CPC ............ G01C 21/3476; G01C 21/3679; G01C 21/3889; G06N 20/00; G06Q 30/0277
USPC ............... 705/14.1, 14.46; 715/716; 455/466
See application file for complete search history.

(56) References Cited

U.S. PATENT DOCUMENTS

| | | | | |
|---|---|---|---|---|
| 2008/0032721 | A1* | 2/2008 | MacDonald | .......... H04L 51/214 455/466 |
| 2010/0332315 | A1* | 12/2010 | Kamar | .............. G06Q 30/0254 705/14.46 |
| 2012/0100869 | A1* | 4/2012 | Liang | ..................... H04W 4/02 455/456.1 |
| 2013/0166209 | A1* | 6/2013 | Pollington | ............ H04W 4/029 701/540 |
| 2013/0262479 | A1* | 10/2013 | Liang | .................... H04W 4/021 707/748 |
| 2013/0345961 | A1* | 12/2013 | Leader | ................... G01C 21/20 701/410 |

(Continued)

OTHER PUBLICATIONS

Cory M. Krause, Short-term travel behavior prediction with GPS, land use, and point of interest data, 2019 (Year: 2019).*

*Primary Examiner* — Tarek Elchanti
(74) *Attorney, Agent, or Firm* — McDonnell Boehnen Hulbert & Berghoff LLP

(57) ABSTRACT

A method implemented by a computing system comprises receiving, by the computing system, content information associated with content being presented on a user device and location information that specifies a location of the user device. A route predictor determines, based on the content information and the location information, one or more future routes associated with a user of the user device. The computing system identifies point of interest (POI) information associated with points of interest along one or more future routes and communicates the POI information to the user device that specifies POI content for presentation by the user device.

12 Claims, 12 Drawing Sheets

(56) References Cited

U.S. PATENT DOCUMENTS

| | | | | |
|---|---|---|---|---|
| 2014/0279723 | A1* | 9/2014 | McGavran | G01C 21/362 |
| | | | | 707/610 |
| 2015/0072712 | A1* | 3/2015 | Huang | H04W 4/029 |
| | | | | 455/456.3 |
| 2015/0074526 | A1* | 3/2015 | Brenner | G06F 16/683 |
| | | | | 715/716 |
| 2016/0006861 | A1* | 1/2016 | Hodges | H04M 15/68 |
| | | | | 455/405 |
| 2017/0303083 | A1* | 10/2017 | Alsina | H04W 4/025 |
| 2019/0312941 | A1* | 10/2019 | Maccini | H04H 60/33 |
| 2021/0095986 | A1* | 4/2021 | Brown | G01C 21/3484 |
| 2022/0005076 | A1* | 1/2022 | Takemura | G06Q 30/0255 |

* cited by examiner

CONTENT MATCHING RECORDS
400

| Content ID | Fingerprint Information |
|---|---|
| CID1 | FP1, FP1, ..., FP$_N$ |
| CID2 | FP1, FP1, ..., FP$_N$ |
| ... | ... |
| CID$_M$ | FP1, FP1, ..., FP$_N$ |

*FIG. 4A*

PANELIST RECORDS
405

| Panelist ID | Demographic Information | Content | Routes |
|---|---|---|---|
| P1 | Age=35, Sex=M, Children Count = 4, ... | CID1, CID10, ... | R1, R2, R3 .... |
| P2 | Age=28, Sex=F, Children Count = 0, ... | CID5, CID9, ... | R15, R16, R17, ... |
| P3 | Age=45, Sex=F, Children Count = 0, ... | CID1, CID9, ... | R105, R106, R107 ... |
| P4 | Age=70, Sex=M, Children Count = 1, ... | CID3, CID11, ... | R200, R202, R203, ... |
| ... | | ... | ... |
| $P_M$ | Age=52, Sex=F, Children Count = 2, ... | CID181, CID250, ... | R502, R503, R504, ... |

FIG. 4B

ROUTE RECORDS
410

| Route ID | Locations | Points of Interest | Time |
|---|---|---|---|
| R1 | L1, L2, L3, ... L$_N$ | POI2, POI3, POI7, POI8 | Morning |
| R2 | L1, L2, L3, ... L$_N$ | POI3, POI7 | 8:00-8:30 AM |
| R3 | L1, L2, L3, ... L$_N$ | POI5 | Evening |
| ⋮ | ⋮ | ⋮ | ⋮ |
| R$_N$ | | | |

*FIG. 4C*

POINT OF INTEREST RECORDS
415

| POI ID | Information |
|---|---|
| POI1 | I1, I2, I3, ... I$_N$ |
| POI2 | I1, I2, I3, ... I$_N$ |
| POI3 | I1, I2, I3, ... I$_N$ |
| ... | ... |
| POI$_N$ | I1, I2, I3, ... I$_N$ |

*FIG. 4E*

GEOGRAPHIC ROUTE BASED COMMUNICATION METHOD AND SYSTEM

RELATED APPLICATIONS

This application claims the benefit of priority under 35 U.S.C. § 119(e) of U.S. Provisional Application No. 63/133,044, filed Dec. 31, 2020, the content of which is incorporated herein by reference in its entirety.

BACKGROUND

Field

This application generally relates to information communication systems. In particular, this application describes a geographic route based communication method and a system for communicating information based on a geographic route.

Description of Related Art

Vehicle radios are configured to receive broadcast content via various analog and digital formats. The broadcast content can correspond to content communicated by a radio station serving a large metropolitan area and can include desired media content (e.g., music, news, etc.) and other informational content such as advertisement content. In instances where the broadcast content is delivered to a large metropolitan area, the informational content may not be particularly relevant to the driver of the vehicle.

SUMMARY

In a first aspect, a method implemented by a computing system comprises receiving, by the computing system, content information associated with content being presented on a user device and location information that specifies a location of the user device. A route predictor determines, based on the content information and the location information, one or more future routes associated with a user of the user device. The computing system identifies point of interest (POI) information associated with points of interest along one or more future routes and communicates the POI information to the user device that specifies POI content for presentation by the user device.

In a second aspect, a computing system includes a memory and a processor. The memory stores instruction code. The processor is in communication with the memory. The instruction code is executable by the processor to cause the computing system to perform operations that include receiving, by the computing system, content information associated with content being presented on a user device and location information that specifies a location of the user device. A route predictor implemented by the computing system determines, based on the content information and the location information, one or more future routes associated with a user of the user device. The computing system identifies point of interest (POI) information associated with points of interest along one or more future routes and communicates the POI information to the user device that specifies POI content for presentation by the user device.

In a third aspect, a non-transitory computer-readable medium having stored thereon instruction code is provided. When the instruction code is executed by a processor, the processor performs operations that include receiving content information associated with content being presented on a user device and location information that specifies a location of the user device. A route predictor implemented by the instruction code determines, based on the content information and the location information, one or more future routes associated with a user of the user device. The processor identifies point of interest (POI) information associated with points of interest along one or more future routes and communicates the POI information to the user device that specifies POI content for presentation by the user device.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 4A illustrates content matching records stored in a database of the ISS, in accordance with an example.

FIG. 4B illustrates panelist records stored in the database of the ISS, in accordance with an example.

FIG. 4C illustrates route records stored in the database of the ISS, in accordance with an example.

FIG. 4E illustrates point of interest records stored in the database of the ISS, in accordance with an example.

DETAILED DESCRIPTION

Figure 1:
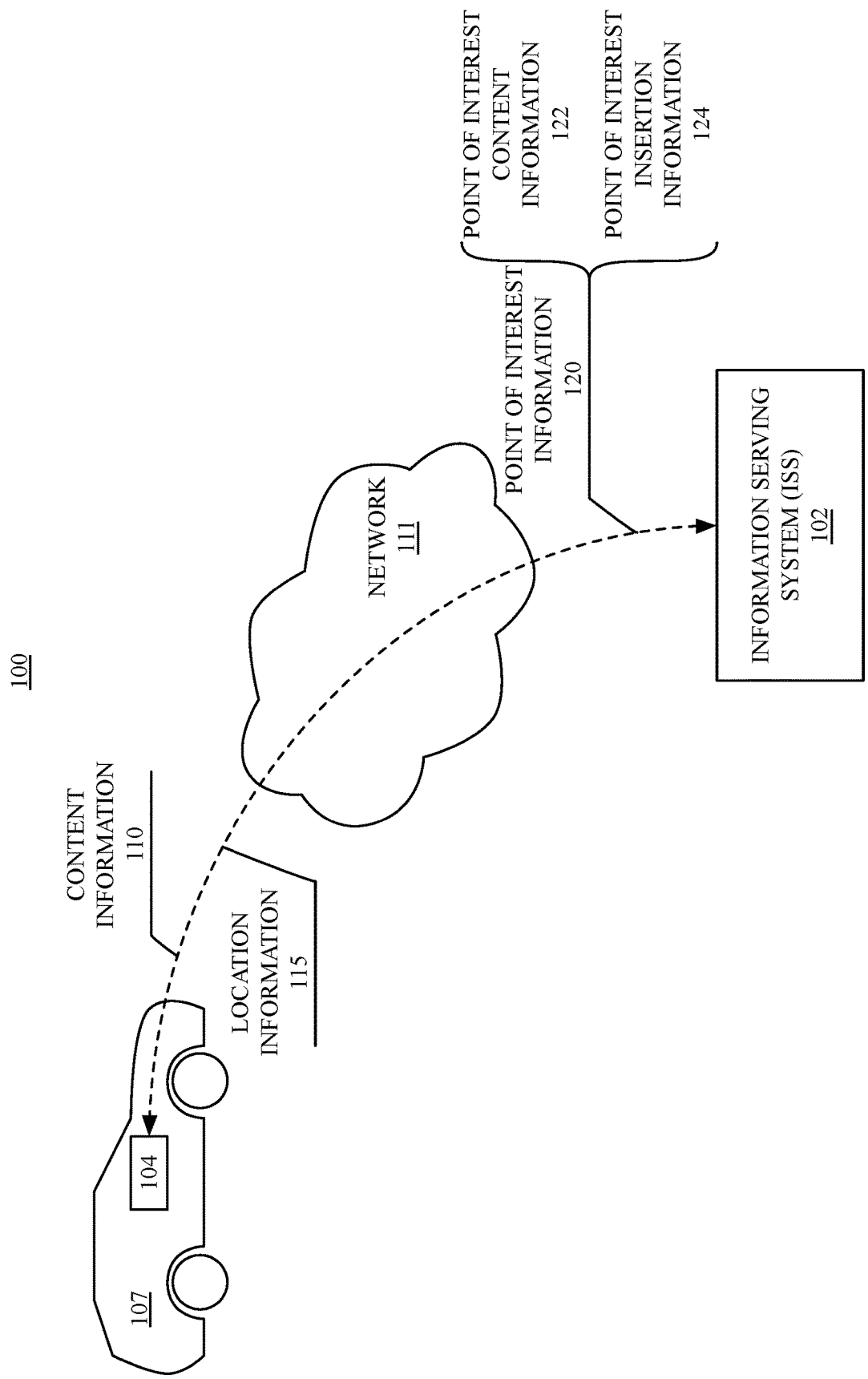
FIG. 1 illustrates an environment that includes various systems/devices that facilitate communicating information related to points-of-interest along a route, in accordance with an example.

Implementations of this disclosure provide technological improvements that are particular to computer technology, such as those related to reducing the amount of time necessary to determine the best result to select and communicate in response to a computer-generated query. In this regard, a computing system is disclosed herein and is configured to predict a geographic route associated with a user device, select the most relevant information associated with points of interest along the driving route, and to communicate at least some of the information to the user device.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

As noted above, informational content communicated as part of a broadcast may not be particularly relevant to a particular user. Some of these issues are ameliorated by certain examples of computing systems disclosed herein. For instance, an example of one computing system is configured to receive content information associated with content being presented on a user device and location information that specifies a location of the user device. Examples of the content information correspond to audio and/or video content (e.g., music, television program, etc.). The computing system is then configured to determine or predict, based on the content information and the location information, one or more future routes associated with a user of the user device. The computing system next identifies one or more points of interest along the predicted routes and point of interest (POI) information (e.g., notices, advertisements, etc.) associated with the points of interest. The computing system communicates the POI information to the user device for presentation by the user device.

In some examples, prediction of the route relies on information garnered from a control group of users referred to herein as panelists. The panelists may belong to a program that provides incentives for divulging information related to various habits, such as one or more music listening habits, television program viewing habits, shopping habits, driving habits, etc. The panelists are provided with specialized computing equipment that facilitates tracking these habits. The computing system operates in conjunction with the panelists computing equipment to aggregate data from a large number of panelists. This data can then be applied to the generalized population to facilitate ascertaining or predicting music listening habits, television program viewing habits, shopping habits, driving habits, etc., associated with the generalized population.

FIG. 1 illustrates an example of an environment 100 that includes various systems/devices that facilitate communicating information related to points-of-interest along a route. Example systems/devices of the environment 100 include a vehicle 107, a user device 104, and a route prediction and information serving system (ISS) 102. As described in further detail below, the user device 104 is configured to communicate content information 110 and location information 115 to the ISS 102. In response to receiving this information, the ISS 102 is configured to communicate point of interest (POI) information 120 to the user device 104. In an example, the user device 104 and ISS 102 communicate information to one another via a communication network 111, such as a cellular communication network, a WiFi network, etc.

Figure 2:
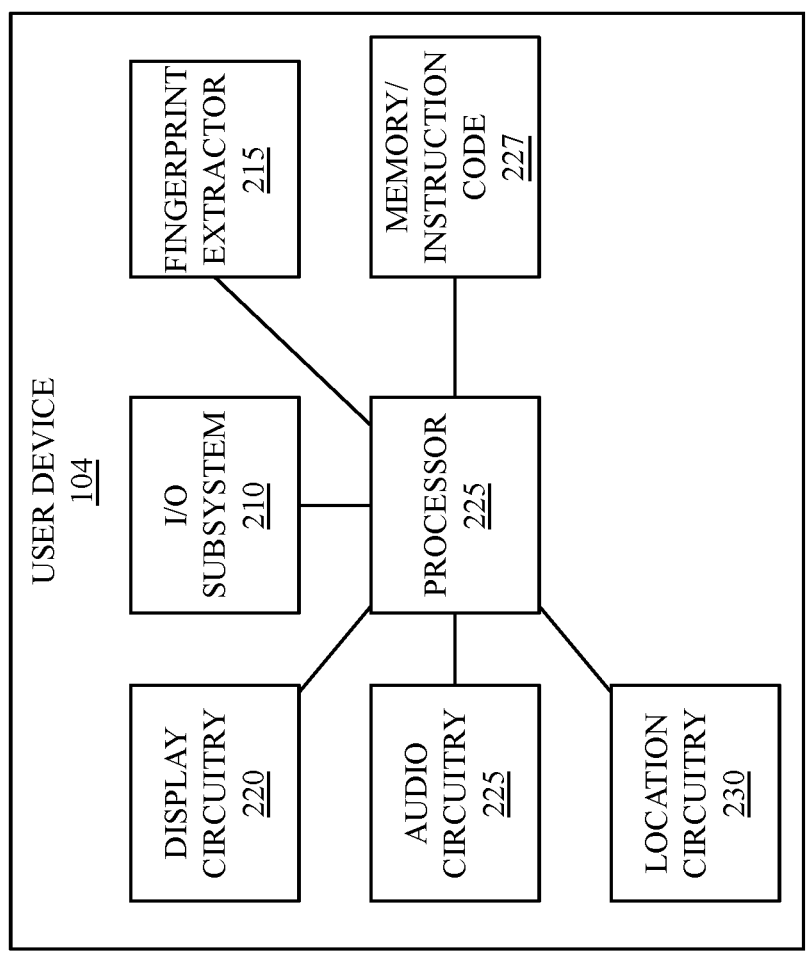
FIG. 2 illustrates a user device, in accordance with an example.

FIG. 2 illustrates an example of a user device 104. The user device 104 corresponds to an audio and/or video presentation device. An example of the user device 104 is fixed, for example, in the vehicle 107. Another example of the user device 104 corresponds to a wearable device, such as a mobile device (e.g., mobile phone, watch, etc.). An example of the user device 104 includes a memory 227 and a processor 205. Another example of the user device 104 also includes an input/output (I/O) subsystem 210, location circuitry 230, display circuitry 220, audio circuitry 225, and a fingerprint extractor 215.

An example of the processor 205 is in communication with the memory 227. The processor 205 is configured to execute instruction code stored in the memory 227. The instruction code facilitates performing, by the user device 104, various operations that are described below. In this regard, the instruction code can cause the processor 205 to control and coordinate various activities performed by the different subsystems of the user device 104. An example of the processor 205 corresponds to a stand-alone computer system such as an Intel®, AMD®, or PowerPC® based computer system or a different computer system and can include application-specific computer systems. An example of the computer system includes an operating system, such as Linux, Unix®, or a different operating system.

An example of the I/O subsystem 210 includes one or more input/output interfaces configured to facilitate communications with other systems of the vehicle 107 and/or entities outside of the vehicle 107. For instance, an example of the I/O subsystem 210 includes wireless communication circuitry configured to facilitate communicating information to and from the ISS 102. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology, or a different wireless network.

An example of the location circuitry 230 corresponds to global positioning system circuitry (GPS circuitry) configured to determine the geographic location of the user device 104. An example of the location circuitry 230 periodically (e.g., every second) determines location information 115 associated with the user device 104, such as the latitude and longitude of the user device 104, at different times. In an example, location information 115 communicated by the user device 104 includes one or more latitude/longitude locations determined by the location circuitry 230.

An example of the display circuitry 220 includes a liquid crystal display (LCD), light-emitting diode display (LED) display, etc. An example of the display circuitry 220 includes a transparent capacitive touch layer that facilitates receiving user commands. An example of the display circuitry 220 is configured to depict a graphical user interface (GUI). An example of the GUI is configured to generate an overlay over some or all of the content being rendered by the display. An example of the overlay facilitates displaying static text/images and/or video content.

An example of the audio circuitry 225 includes one or more digital-to-analog converters (DAC), amplifiers, speakers, etc. An example of the audio circuitry 225 is configured to receive multiple streams of audio content (e.g., left channel, right channel, etc.) and to route these streams to corresponding DACs, amplifiers, and speakers. An example of the audio circuitry 225 is configured to mix audio content from two or more streams together and to route the combined streams to a single DAC, amplifier, and speaker.

An example of the fingerprint extractor 215 is configured to generate fingerprints associated with samples of content being presented by the user device 104. In the audio context, the fingerprints are associated with audio samples and specify the energy of various frequency components present in the audio samples (e.g., represented in bins generated by a Fast Fourier Transform (FFT)). In an example, the fingerprints of audio content are sampled at a periodic rate, such as every 60 ms. In the video context, fingerprints are associated with video samples or frames and specify discrete cosine transform representations of the video samples or frames. In an example, the fingerprints of video content are sampled at a periodic rate, such as every 5 seconds. In an example, the content information 110 communicated by the user device 104 includes one or more fingerprints extracted by the fingerprint extractor 215.

An example of the POI information 120 specifies POI content information 122 to be presented by the user device 104. An example of the POI content information 122 corresponds to one or more images, audios, videos, or combinations thereof to be presented by the user device 104. For instance, in an example, the POI content information 122 is presented in the overlay generated by the GUI described above. Within examples, the content is associated with one or more points of interest, such as restaurants, museums, parks, municipal offices (e.g., post office, driver's license facility), etc. Examples of the content correspond to advertisements or other types of information associated with the points of interest.

An example of the POI information 120 further specifies POI insertion information 124. An example of the POI insertion information 124 specifies one or more fingerprints expected to be generated by the fingerprint extractor 215 at a future time, such as 30 seconds into the future, 1 minute into the future, etc. An example of the POI insertion information 124 facilitates determining an information insertion time in content being presented by the user device 104. For instance, in an example, audio content being presented by the user device 104 may correspond to a broadcast that includes one or more songs and commercials interposed between the songs. In this example, the POI insertion information 124 specifies fingerprints associated with audio content that is presented proximate to the presentation of the commercial (e.g., at the end of the song, at the beginning of the commercial, 500 ms before the commercial).

During operation, the user device 104 is configured to present the POI content information 122 specified in the POI information 120 when the fingerprint extractor 215 generates a fingerprint that matches a fingerprint specified in the POI insertion information 124. As noted above, in an example, presentation of the content specified in the POI information 120 involves generating, by the display circuitry 220, an overlay on a display to present video content specified in the POI information 120. In the audio context, presentation of the content involves mixing or replacing, by the audio circuitry 225, audio content communicated as part of a broadcast with audio content specified in the POI content information 122. For instance, in an example, the audio circuitry 225 is configured to replace advertisement-related audio content communicated during a broadcast with the audio content specified in the POI content information 122.

Figure 3:
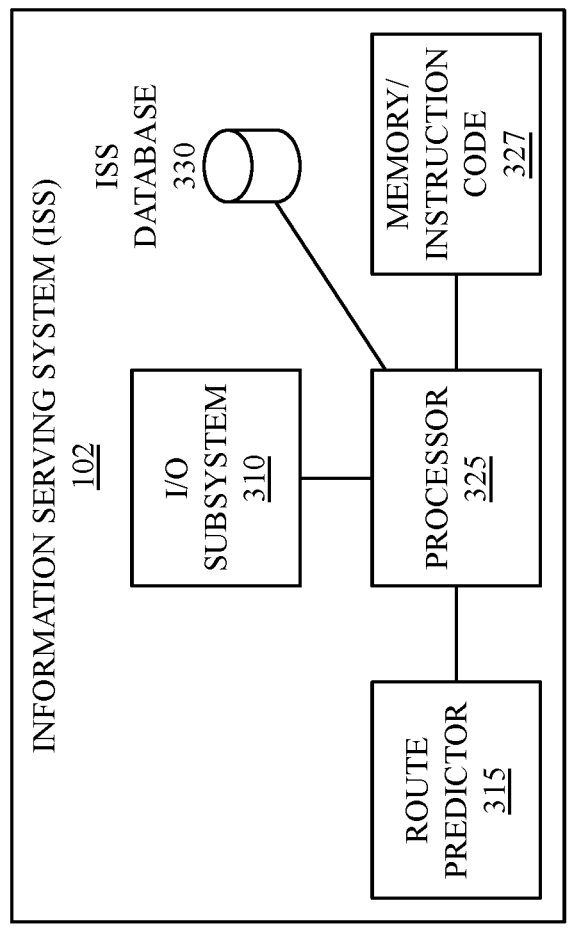
FIG. 3 illustrates an information serving system (ISS), in accordance with an example.

FIG. 3 illustrates an example of an information serving system (ISS) 102. An example of the ISS 102 includes a memory 327 and a processor 325. An example of ISS 102 also includes an input/output (I/O) subsystem 310, a route predictor 315, and an ISS database 330.

An example of the processor 325 is in communication with the memory 327. The processor 325 is configured to execute instruction code stored in the memory 327. The instruction code facilitates performing, by the ISS 102, various operations that are described below. In this regard, the instruction code can cause the processor 325 to control and coordinate various activities performed by the different subsystems of the ISS 102. The processor 325 can correspond to a stand-alone computer system such as an Intel®, AMD®, or PowerPC® based computer system or a different computer system and can include application-specific computer systems. The computer system can include an operating system, such as Linux, Unix®, or a different operating system.

An example of the I/O subsystem 310 includes one or more input/output interfaces configured to facilitate communications with entities outside of the ISS 102. An example of the I/O subsystem 310 is configured to communicate information via a RESTful API or a Web Service API. An example of I/O subsystem 310 implements a web browser to facilitate generating one or more web-based interfaces through which users of the ISS 102, user device 104, and/or other systems interact with the ISS 102.

An example of the I/O subsystem 310 includes wireless communication circuitry configured to facilitate communicating information to and from the ISS 102. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology, or a different wireless network.

An example of the route predictor 315 is configured to, alone or in combination with other subsystems of the ISS 102, predict a user's route based on the content information 110 and location information 115 communicated from the user device 104. Some examples of the route predictor 315 include hardware, software, or a combination thereof that is specifically configured to implement or assist in the implementation of various supervised and unsupervised machine learning models. Within examples, these can involve implementation of a Holt-Winters algorithm, exponential time smoothing (ETS) algorithm, an artificial neural network (ANN), a recurrent neural network (RNN), a seasonal autoregressive moving average (SARIMA) algorithm, a network of long short-term memories (LSTM), a gated recurring unit (GRU) algorithm. Examples of the route predictor 315 can implement other machine learning (ML) logic and/or AI algorithms. As described in further detail below, in an example, panelist information is used to train the route predictor 315 to predict a route based on the content information 110 and the location information 115 communicated from the user device 104.

It is contemplated that any of the subsystems referenced herein can correspond to a stand-alone computer system such as an Intel®, AMD®, or PowerPC® based computer system or a different computer system and can include application-specific computer systems. The computer systems can include an operating system, such as Microsoft Windows®, Linux, Unix®, or another operating system. It is also contemplated that operations performed on the various subsystems can be combined into a fewer or greater number of subsystems to facilitate speed scaling, cost reductions, etc.

FIG. 4A illustrates an example of content matching records 400 stored in the ISS database 330. In an example, the content matching records 400 include a content ID field and a fingerprint information field. An example of a content ID field specifies information (e.g., a randomly assigned value, a hash of content data) that uniquely identifies particular content (e.g., a particular song, television show, movie, commercial). An example of the fingerprint information field specifies one or more fingerprints associated with particular content. In the audio context, an example of a fingerprint is associated with an audio sample and specifies the energy of the various frequency components present in the audio sample. In an example, the energy levels of the frequency are obtained via a Fast Fourier Transform (FFT), and the output bins of the FFT associated with a particular sample are stored in a fingerprint that is then associated with the sample. In an example, for each content ID, the fingerprint information includes fingerprints sampled at a periodic rate, such as every 60 ms. In the video context, an example of a fingerprint is associated with a video sample or frame and specifies a discrete cosine transform representation of the video sample or frame. In an example, for each content ID, the fingerprint information includes fingerprints sampled at a periodic rate, such as every 5 seconds.

FIG. 4B illustrates an example of panelist records 405 stored in the ISS database 330. In an example, the panelist records 405 include a panelist identifier field, a demographic information field, a content field, and a route field. An example of a panelist identifier field specifies information (e.g., a randomly assigned value, a hash of panelist biographic information) that uniquely identifies a particular panelist. An example of the demographic information field specifies the age, sex, number of children, etc., associated with particular panelists.

An example of the content field specifies one or more of the content IDs associated with content to which the corresponding panelist listens, views, etc. Examples of the content IDs correspond to the content IDs specified in the content matching records 400. As noted above, panelists are provided with computing equipment that facilitates monitoring their listening habits, viewing habits, driving habits, etc. In an example, the content specified in the panelist records 405 corresponds to content detected by the computing equipment. In some examples, a value indicative of the number of times a panelist has listened to the content is associated with the content specified in the panelist records.

An example of the route field specifies one or more route IDs associated with routes the panelist has taken. The route IDs are further specified in the records of the ISS database 330.

Figure 4D:
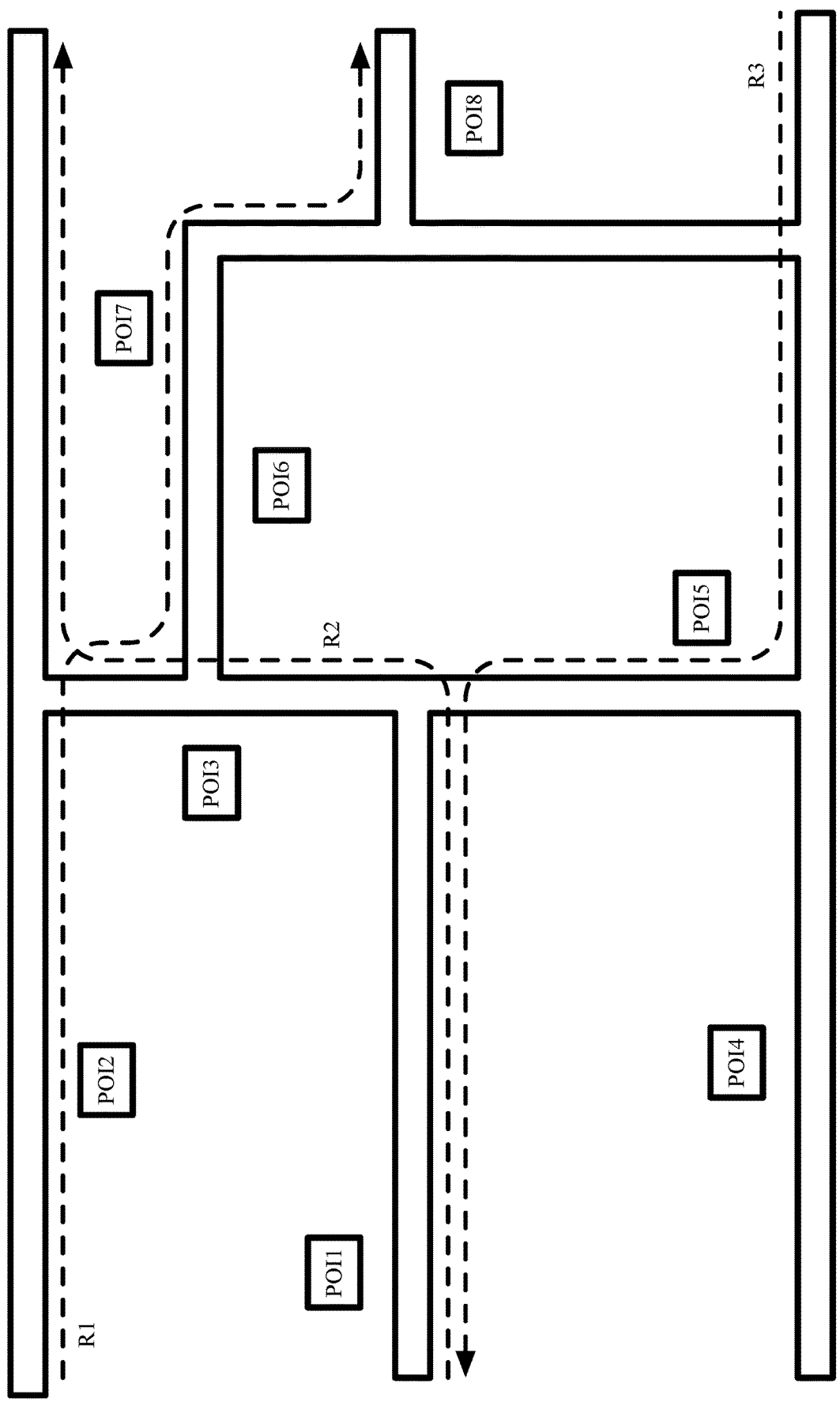
FIG. 4D graphically illustrates routes specified in the route records, in accordance with an example.

FIG. 4C illustrates an example of route records 410 stored in the ISS database 330. FIG. 4D graphically illustrates examples of routes specified in the route records. In the example, the route records 410 include a route identifier field, a locations field, a point of interest (POI) field, and a time field. An example of a route identifier field specifies information (e.g., a randomly assigned value, a hash of locations) that uniquely identifies a particular route. An example of the locations field specifies one or more locations (e.g., latitude, longitude coordinates) that specify a particular route. In another example, the locations field specifies directions taken at different intersections (e.g., turn right at Main Street, turn left at Center Street).

An example of a time field specifies time information associated with each route. An example of the time information specifies "morning," "afternoon," etc., or a particular time or time range (e.g., 8:00 AM-9:00 AM).

An example of a POI field specifies one or more points of interest that are located along the route. For example, a first route, R1, is associated with points of interest POI2, POI3, POI7, and POI8. A second route, R2, is associated with points of interest POI3 and POI7. A third route, R3, is associated with points of interest POI5. In an example, the points of interest correspond to points of interest specifically visited by, or indicated as being visited by, a particular panelist. For example, according to the panelist records 405, routes R1, R2, and R3 are associated with panelist P1. Following this example, points of interest POI2, POI3, POI7, and POI8 correspond to points of interest specifically visited by, or indicated as being visited by, the panelist associated with panelist ID P1. In another example, the points of interest correspond to points of interest identified via, for example, publicly available records as being located along a particular route.

An example of the route field specifies one or more route IDs associated with routes the panelist has taken. The route IDs are further specified in the records of the ISS database 330.

Figure 5:
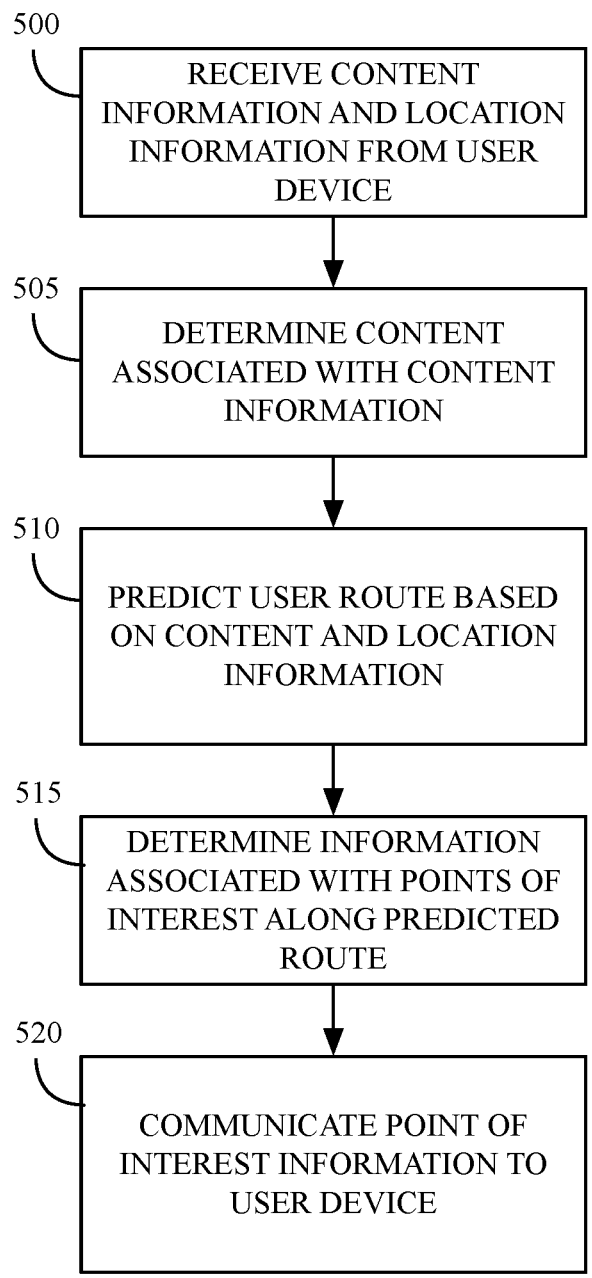
FIG. 5 illustrates operations performed by the user device and the ISS, in accordance with an example.

FIG. 4E illustrates an example of POI records 415 stored in the ISS database 330. In the example, the POI records 415 include a POI field and an information field. An example of a POI field specifies information (e.g., a randomly assigned value) that uniquely identifies a particular point of interest. An example of the information field specifies one or more information items (e.g., advertisements, informational notices, brochure information) associated with a particular point of interest. Examples of the points-of-interest correspond to restaurants, museums, municipal offices (e.g., post office, driver's license facility), etc. An example of an information item corresponds to actual content (e.g., audio content, video content, etc.). In another example, the information item corresponds to a link (e.g., a uniform resource locator (URL)) to a different system that stores the content FIG. 5 illustrates examples of operations performed by entities of the environment of FIG. 1, such as the user device 104 and the ISS 102. In this regard, one or more of the operations can be implemented via instruction code, stored in respective memories of the user device 104 and the ISS 102 configured to cause the processors of the user device 104 and the ISS 102 to perform the operations illustrated in the figures and discussed herein.

At block 500, the ISS 102 receives content information 110 and location information 115 from the user device 104. As noted above, an example of the user device 104 includes location circuitry 230, such as global positioning system circuitry (GPS circuitry) configured to determine the geographic location of the user device 104. An example of the location circuitry 230 periodically (e.g., every second) determines location information 115 associated with the user device 104, such as the latitude and longitude of the user device 104 at different times. In an example, location information 115 communicated by the user device 104 includes one or more latitude/longitude locations determined by the location circuitry 230.

An example of the user device 104 also includes a fingerprint extractor 215 configured to generate fingerprints associated with samples of content being presented by the system 1. In the audio context, the fingerprints are associated with audio samples and specify the energy of various frequency components present in the audio samples (e.g., represented in bins generated by a Fast Fourier Transform (FFT)). In an example, the fingerprints of audio content are sampled at a periodic rate, such as every 60 ms. In the video context, fingerprints are associated with video samples or frames and specify discrete cosine transform representations of the video samples or frames. In an example, the fingerprints of video content are sampled at a periodic rate, such as every 5 seconds. In an example, the content information 110 communicated by the user device 104 includes one or more fingerprints extracted by the fingerprint extractor 215.

At block 505, the ISS 102 determines specific content associated with the content information 110. In an example, determining the specific content involves searching the content matching records 400 of the ISS database 330 for a record that matches the content information 110. For instance, the ISS 102 compares a number of fingerprints (e.g., ten consecutively generated fingerprints) specified in the content information 110 with consecutively generated fingerprints specified in the fingerprint information field of each content matching record 400. When a matching group of fingerprints is found in a content matching record 400, the ISS 102 determines the content information 110 to correspond to the content associated with the content ID specified in the corresponding content ID field. As previously noted, an example of a content ID field specifies information (e.g., a randomly assigned value, a hash of content data) that uniquely identifies particular content (e.g., a particular song, television show, movie, commercial).

At block 510, the user's route is predicted based on the content determined above and the location information 115 received from the user device 104. In an example, prediction of the user's route is performed by the route predictor 315 alone or in combination with other subsystems of the ISS 102. In an example, the content field of each panelist record 405 is searched to determine whether the content ID determined above is present in the content field of the panelist record 405. When a match is found, the panelist record 405 is selected.

Next, the selected panelist records 405 are searched for routes that match the location information 115 communicated from the user device 104. In this regard, an example of the route predictor 315 searches the route field of each selected panelist record 405 to determine whether the location information 115 matches a route specified in the route field of the record. As noted above, in some examples, routes specified in the route field are associated, via corresponding route records 410, with geographic locations or coordinates (e.g., latitude, longitude coordinates). In some examples, these routes specify time information such as "morning," "afternoon," etc., or a particular time or time range (e.g., 8:00 AM-9:00 AM). In these examples, determining whether the location information 115 matches a particular route involves determining a sequence of location points (e.g., latitude, longitude coordinates) specified in the location information 115 that match a sequence of location points associated with routes of selected panelist records 405 that are in turn associated with the same time information (e.g., routes that were taken at a similar time of day). The route (or route ID) having the closet match is selected.

As noted above, an example of the route predictor 315 includes machine learning logic configured to classify the content and location information 115 as being associated with a particular route. In this case, predicting the user's route involves processing the content determined above and the location information 115 received from the user device 104 through the machine learning logic. In an example, the machine learning logic is trained with panelist information that associates content information with route information. For example, content IDs specified in the panelist records along with random locations and times associated with corresponding routes specified in the panelist records can be input into the input layer of a fully connected network of the machine learning logic. Each output of the machine learning logic is associated with a particular route specified in the panelist records (e.g., R1, R2, R3). The value of each output represents the probability that the content and location information 115 input into the machine learning logic is associated with a particular route. The weights of the machine learning logic can be adjusted through successive iterations (e.g., via backpropagation) to drive the outputs of the machine learning logic to correctly predict the route associated with a particular content ID and location being input into the input layer of the machine learning logic. After a sufficient number of iterations, the machine learning logic is trained.

At block 515, the ISS 102 determines information associated with points of interest that are, in turn, associated with the predicted route. In an example, determining the information involves searching the POI records 415 of the ISS database 330 for one or more POI records 415 associated with POIs that are specified in the POI field of the selected route. For example, as described above, a first route, R1, is associated with points of interest POI2, POI3, POI7, and POI8. A second route, R2, is associated with points of interest POI3 and POI7. A third route, R3, is associated with points of interest POI5. Examples of the points-of-interest correspond to restaurants, museums, municipal offices (e.g., post office, driver's license facility), etc.

If the predicted route is determined to correspond to the first route, then following the example above, the points of interest would correspond to one or more of POI2, POI3, POI7, and POI8. In some examples, the points of interest correspond to those the user has not yet passed. For instance, if the route is determined to correspond to the first route, R1, and, based on the location information 115 from the user device 104, the ISS 102 determines that the user has not yet passed POI2, then, in one example, the points of interest would correspond to POI2, POI3, POI7, and POI8. On the other hand, if the user has already passed POI2 and POI3, then the points of interest would correspond to POI7 and POI8. In some examples, ISS 102 refrains from sending information associated with points of interest that the user will soon pass. For instance, in an example, the ISS 102 refrains from sending information associated with points of interest that are less than a threshold amount of time away (e.g., 30 seconds away). In some examples, the ISS 102 takes into consideration the speed at which the user (or vehicle) is moving in making this determination. For instance, in an example, the threshold is increased with increased vehicle speed. In an example, the ISS 102 determines the speed of the vehicle based on the location information 115 communicated from the user device 115. In another example, the user device 104 determines the speed and specifies the speed in the location information 115.

After determining the POIs associated with the predicted route, one or more POI information items associated with the POIs are determined. In an example, determining the POI information items involves searching the POI records 415 of the ISS database 330 for records that match the POIs. POI information items specified in correspond information fields of matching POI records 415 are selected.

At block 520, one or more of the selected POI information items are communicated to the user device 104. In an example, when multiple POI information items (e.g., advertisements) are associated with a particular POI, a particular POI information item may be communicated. For instance, in an example, one or more of the POI information items is associated with a bid. The POI information item associated with the highest bid is communicated. In another example, each POI information item is associated with a target impression ratio that corresponds to the ratio of actual impressions to target impressions. POI information items having a lower target impression ratio may be selected before POI information items have a higher target impression ratio.

As noted above, an example of the POI information 120 specifies POI insertion information 124. An example of the POI insertion information 124 specifies one or more fingerprints expected to be generated by the fingerprint extractor 215 of the user device 104 at a future time. (e.g., 30 seconds into the future, 1 minute into the future). In an example, these fingerprints are specified in the content matching records 400 of the ISS database 330 and correspond to fingerprints generated at a time later than the time at which the fingerprints received at block 500 are generated.

As noted above, during operation, the user device 104 is configured to present the POI content information 122 specified in the POI information 120 when the fingerprint extractor 215 generates a fingerprint that matches a fingerprint specified in the POI insertion information 124. In an example, the presentation of the POI content information 122 involves generating, by the display circuitry 220, an overlay on a display to present POI content information 122 that corresponds to video content. Another example involves mixing, by the audio circuitry 225, POI content information 122 corresponding to audio content with audio content communicated as part of a broadcast.

Figure 6:
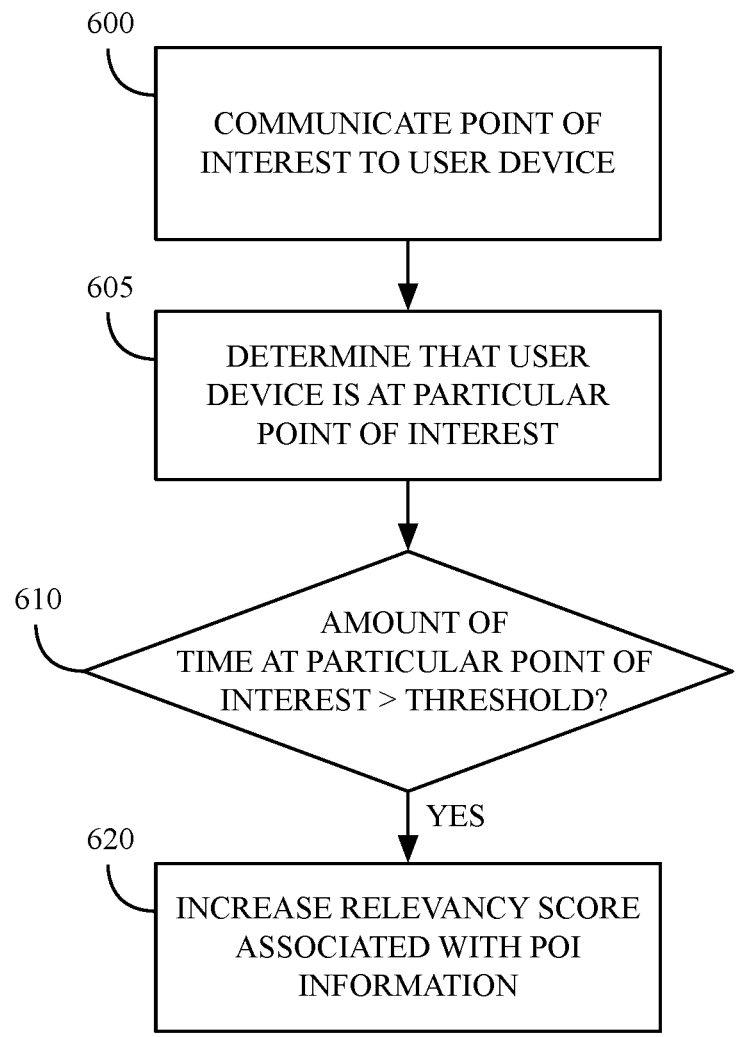
FIG. 6 illustrates further operations performed by the user device and the ISS, in accordance with an example.

FIG. 6 illustrates examples of further operations performed by entities of the environment of FIG. 1, such as the user device 104 and the ISS 102. In this regard, one or more of the operations can be implemented via instruction code, stored in respective memories of the user device 104 and the ISS 102 configured to cause the processors of the user device 104 and the ISS 102 to perform the operations illustrated in the figures and discussed herein.

At block 600, POI information 120 is communicated to the user device 104. As noted above, an example of the POI information 120 specifies POI content information 122 and POI insertion information 124. An example of the POI content information 122 corresponds to an advertisement associated with a particular point of interest.

At block 605, the user device 104 is determined to be at the particular point of interest associated with the POI information 120. For instance, an example of the user device 104 is configured to communicate an indication to the ISS 102 that the user device 104 has arrived at the particular point of interest.

If at block 610, the amount of time the user device 104 remains at the point of interest exceeds a threshold amount of time, then at block 620, a relevancy score associated with the POI information 120 is increased. For instance, in an example, the user device 104 is configured to start a timer after the user device 104 has arrived at the point of interest. The user device 104 is then configured to communicate an indication to the ISS 102 when the amount of time spent at the point of interest has reached the threshold amount of time. In another example, the user device 104 communicates an indication to the ISS 102 that the user device 104 has left the point of interest, and the ISS 102 computes the amount of time the user device 104 spent at the point of interest.

In some examples, the relevancy score is taken into consideration in deciding, by the ISS 102, whether to communicate particular POI information 120. For instance, in an example, the ISS 102 communicates POI information 120 associated with a higher relevancy score before POI information 120 associated with a lower relevancy score. In some examples, the ISS 102 considers other information as well, such as a bid amount associated with the POI information 120 and a target impression ratio associated with the POI information 120.

Figure 7:
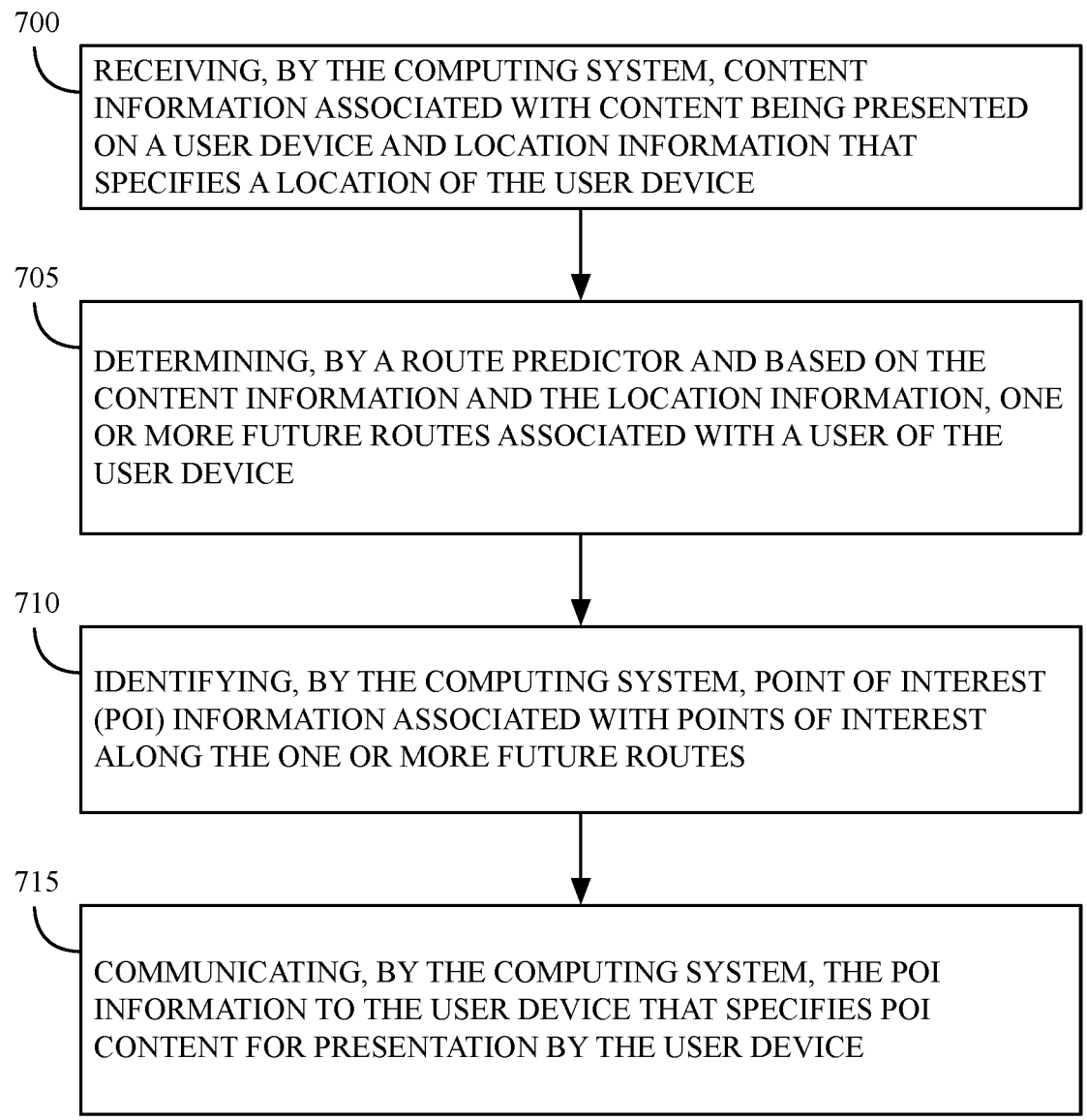
FIG. 7 illustrates a method that can be performed by one or more systems or devices described herein, in accordance with an example.

FIG. 7 illustrates an example of a method that can be performed by one or more systems or devices described herein.

Block 700 involves receiving, by the computing system, content information 110 associated with content being presented on a user device 104 and location information 115 that specifies a location of the user device 104.

Block 705 involves determining, by a route predictor and based on the content information 110 and the location information 115, one or more future routes associated with a user of the user device 104.

Block 710 involves identifying, by the computing system, point of interest (POI) information associated with points of interest along one or more future routes.

Block 715 involves communicating, by the computing system, the POI information 120 to the user device 104 that specifies POI content for presentation by the user device 104.

In an example of the method, the route predictor comprises machine learning logic. This example involves training, by the computing system, the machine learning logic with panelist information that associates content information with route information.

In an example of the method, communicating the POI information 120 to the user involves communicating, by the computing system, the POI information 120 at a time proximate to a time the location information 115 is received.

In an example of the method, communicating the POI information 120 to the user involves communicating one or more advertisements associated with one or more establishments located along one or more future routes.

In an example of the method, receiving content information 110 associated with content being presented to a user involves receiving fingerprint information associated with the content being communicated to the user; and determining, based on the fingerprint information, particular content associated with the content information 110.

In an example of the method, communicating the POI information 120 to the user involves communicating POI information 120 that comprises POI insertion information 124. In this example, the POI insertion information 124 specifies a point within the content being presented at which the POI content is to be inserted.

In an example of the method, the user device 104 comprises location circuitry. In this example, wherein receiving the location information 115 associated with the user device 104 involves receiving one or more locations from the location circuitry of the user device 104.

In an example of the method, the information communicated to the user device 104 is associated with a particular point of interest and a score. This example involves, subsequent to communicating the point of interest information, determining an amount of time that the user device 104 is located at the particular point of interest. This example involves increasing, by the computing system, the score associated with the point of interest information when the determined amount of time reaches or exceeds a threshold amount of time.

In an example of the method, subsequent to communicating the POI information 120 to the user device 104, the method further involves determining based on updated location information 115 associated with the user device 104 that the user of the user device 104 is not following the one or more future routes; and communicating, by the computing system, an indication to the user device 104 to refrain from presenting the POI information 120 to the user.

An example of the method involves determining, by the predictor and based on the updated location information 115, one or more second future routes associated with the user device 104; identifying, by the computing system, second POI information 120 associated with points of interest along the one or more second future routes; and communicating, by the computing system, the second POI information 120 to the user device 104 for presentation of the second point of interest information that specifies second POI content for presentation by the user device 104.

Figure 8:
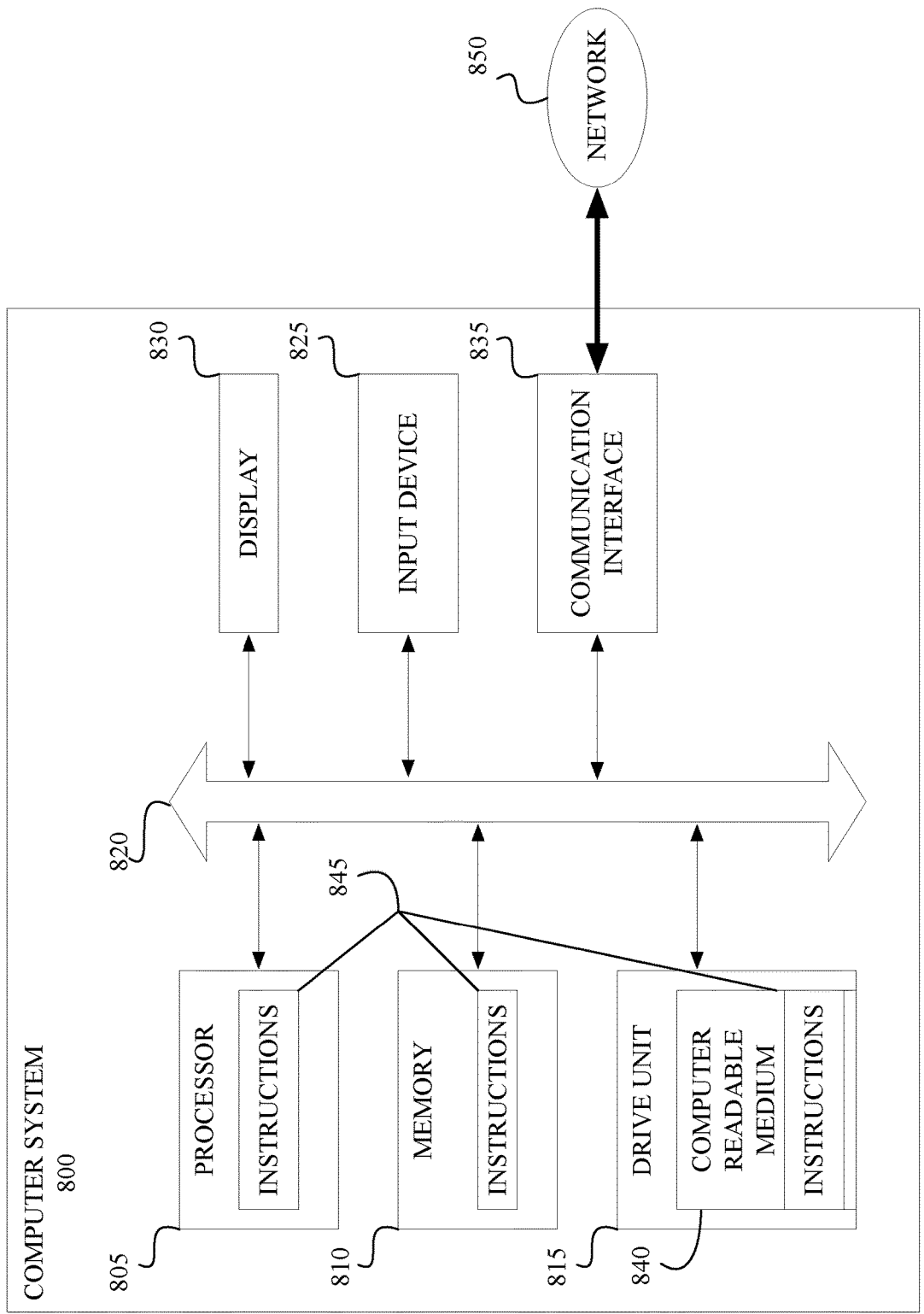
FIG. 8 illustrates a computer system that can form part of or implement any of the systems or devices of the environment, in accordance with an example.

FIG. 8 illustrates an example of a computer system 800 that can form part of or implement any of the systems and/or devices described above. The computer system 800 can include a set of instructions 845 that the processor 805 can execute to cause the computer system 800 to perform any of the operations described above. An example of the computer system 800 can operate as a stand-alone device or can be connected, e.g., using a network, to other computer systems or peripheral devices.

In a networked example, the computer system 800 can operate in the capacity of a server or as a client computer in a server-client network environment, or as a peer computer system in a peer-to-peer (or distributed) environment. The computer system 800 can also be implemented as or incorporated into various devices, such as a personal computer or a mobile device, capable of executing instructions 845 (sequential or otherwise), causing a device to perform one or more actions. Further, each of the systems described can include a collection of subsystems that individually or jointly execute a set, or multiple sets, of instructions to perform one or more computer operations.

The computer system 800 can include one or more memory devices 810 communicatively coupled to a bus 820 for communicating information. In addition, code operable to cause the computer system to perform operations described above can be stored in the memory 810. The memory 810 can be random-access memory, read-only memory, programmable memory, hard disk drive, or any other type of memory or storage device.

The computer system 800 can include a display 830, such as a liquid crystal display (LCD), a cathode ray tube (CRT), or any other display suitable for conveying information. The display 830 can act as an interface for the user to see processing results produced by processor 805.

Additionally, the computer system 800 can include an input device 825, such as a keyboard or mouse, or touchscreen, configured to allow a user to interact with components of system 800.

The computer system 800 can also include a disk or optical drive unit 815. The drive unit 815 can include a computer-readable medium 840 in which the instructions 845 can be stored. The instructions 845 can reside completely, or at least partially, within the memory 810 and/or within the processor 805 during execution by the computer system 800. The memory 810 and the processor 805 also can include computer-readable media, as discussed above.

The computer system 800 can include a communication interface 835 to support communications via a network 850. The network 850 can include wired networks, wireless networks, or combinations thereof. The communication interface 835 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A method comprising:
   determining by a computing system (i) content of a broadcast that is being presented by a device in a vehicle and (i) geographic location of the device, wherein determining the content of the broadcast that is being presented by the device in the vehicle comprises receiving fingerprint data representing the content of the broadcast that is being presented by the device in the vehicle, and matching the received fingerprint data with fingerprint data in a content matching record, wherein the device comprises location circuitry, and wherein determining the geographic location of the device comprises receiving location data from the location circuitry of the device;
   based on reference data that correlates past route information with the determined content and geographic location, predicting by the computing system a future route of the device, wherein the reference data comprises information about panelist consumption of the determined content; and based on the prediction of the future route, configuring by the computing system the device to insert, into the content being presented by the device, information about one or more determined points along the predicted future route, wherein predicting the future route of the device based on the reference data that correlates past route information with the determined content and geographic location comprises using a machine-learning model that is trained to correlate (i) input data defining content and location to (ii) output data defining route probability, wherein using the machine-learning model comprises processing through the machine-learning model the determined content and geographic location information to cause the machine-learning model to output, based on the determined content and the geographic location, a prediction of the future route of the device, the method further comprising training, by the computing system, the machine-learning model with information that associates content information with route information.

2. The method of claim 1, wherein predicting the future route of the device based on the reference data that correlates past route information with the determined content and geographic location comprises (i) selecting a set of data records based on each data record in the selected set indicating panelist consumption of the determined content and (ii) searching the selected set of data records for a route matching the determined geographic location.

3. The method of claim 1, wherein configuring the device to present the information about the one or more determined points along the predicted future route comprises communicating the information to the device to enable the device to present the information.

4. The method of claim 1, further comprising:
determining by the computing system, based on updated geographic location of the device, that the device is not following the predicted future route; and
responsive to the determining that the device is not following the predicted future route, causing by computing system the device to refrain from presenting the information about the one or more determined points along the predicted future route.

5. The method of claim 1, wherein presenting the information about the one or more determined points along the predicted future route comprises presenting the information as a content overlay.

6. A computing system comprising:
one or more processors; and
a memory in communication with the one or more processors, wherein the memory stores instruction code that, when executed by the one or more processors, causes the computing system to perform operations including:
determining (i) content of a broadcast that is being presented by a device in a vehicle and (i) geographic location of the device, wherein determining the content of the broadcast that is being presented by the device in the vehicle comprises receiving fingerprint data representing the content of the broadcast that is being presented by the device in the vehicle, and matching the received fingerprint data with fingerprint data in a content matching record, wherein the device comprises location circuitry, and wherein determining the geographic location of the device comprises receiving location data from the location circuitry of the device, based on reference data that correlates past route information with the determined content and geographic location, predicting a future route of the device, wherein the reference data comprises information about panelist consumption of the determined content, and based on the prediction of the future route, configuring the device to insert, into the content being presented by the device, information about one or more determined points along the predicted future route, wherein predicting the future route of the device based on reference to the data that correlates past route information with the determined content and geographic location comprises using a machine-learning model that is trained to correlate (i) input data defining content and location to (ii) output data defining route probability, wherein using the machine-learning model comprises processing through the machine-learning model the determined content and geographic location information to cause the machine-learning model to output, based on the determined content and the geographic location, a prediction of the future route of the device, and wherein the operations additionally include training the machine-learning model with information that associates content information with route information.

7. The computing system of claim 6, wherein predicting the future route of the device based on the reference data that correlates past route information with the determined content and geographic location comprises (i) selecting a set of data records based on each data record in the selected set indicating panelist consumption of the determined content and (ii) searching the selected set of data records for a route matching the determined geographic location.

8. The computing system of claim 6, wherein configuring the device to present the information about the one or more determined points along the predicted future route comprises communicating the information to the device to enable the device to present the information.

9. The computing system claim 6, wherein the operations additionally include:
determining, based on updated geographic location of the device, that the device is not following the predicted future route; and
responsive to the determining that the device is not following the predicted future route, causing the device to refrain from presenting the information about the one or more determined points along the predicted future route.

10. The computing system of claim 6, wherein presenting the information about the one or more determined points along the predicted future route comprises presenting the information as a content overlay.

11. A non-transitory computer-readable medium having stored thereon instruction code that, when executed by one or more processors of a computing system, causes the computing system to perform operations comprising:
determining (i) content of a broadcast that is being presented by device in a vehicle and (i) geographic location of the device, wherein determining the content of the broadcast that is being presented by the device in the vehicle comprises receiving fingerprint data representing the content of the broadcast that is being presented by the device in the vehicle, and matching the received fingerprint data with fingerprint data in a content matching record, wherein the device comprises location circuitry, and wherein determining the geographic location of the device comprises receiving location data from the location circuitry of the device, based on reference data that correlates past route information with the determined content and geographic location, predicting a future route of the device, wherein the reference data comprises information about panelist consumption of the determined content, and based on the prediction of the future route, configuring the device to insert, into the content being presented by the device, information about the one or more determined points along the predicted future route, wherein predicting the future route of the device based on reference to the data that correlates past route information with the determined content and geographic location comprises using a machine-learning model that is trained to correlate (i) input data defining content and location to (ii) output data defining route probability, wherein using the machine-learning model comprises processing through the machine-learning model the determined content and geographic location information to cause the machine-learning model to output, based on the determined content and the geographic location, a prediction of the future route of the device, and wherein the operations additionally comprise training the machine-learning model with information that associates content information with route information.

12. The non-transitory computer-readable medium of claim 11, wherein configuring the device to present the information about the one or more determined points along the predicted future route comprises communicating the information to the device to enable the device to present the information.

* * * * *